June 1, 1954  J. HAZELTINE  2,679,825
MEANS FOR ASSESSING THE EGG-PRODUCTIVITY OF POULTRY
Filed March 24, 1952   4 Sheets-Sheet 1

Inventor
John Hazeltine
By Peck & Peck
Attorneys

June 1, 1954

J. HAZELTINE 2,679,825

MEANS FOR ASSESSING THE EGG-PRODUCTIVITY OF POULTRY

Filed March 24, 1952

Inventor
John Hazeltine
By Peck & Peck
Attorneys

June 1, 1954  J. HAZELTINE  2,679,825
MEANS FOR ASSESSING THE EGG-PRODUCTIVITY OF POULTRY
Filed March 24, 1952  4 Sheets-Sheet 3

Inventor
John Hazeltine
By Peck & Peck
Attorneys

June 1, 1954  J. HAZELTINE  2,679,825
MEANS FOR ASSESSING THE EGG-PRODUCTIVITY OF POULTRY
Filed March 24, 1952  4 Sheets-Sheet 4

Inventor
John Hazeltine
By Peck & Peck
Attorneys

Patented June 1, 1954

2,679,825

UNITED STATES PATENT OFFICE 2,679,825

MEANS FOR ASSESSING THE EGG-PRODUCTIVITY OF POULTRY

John Hazeltine, Nelson, England

Application March 24, 1952, Serial No. 278,197

10 Claims. (Cl. 119—45)

The invention relates to a means for assessing the egg-productivity of utility poultry, such as hens and pullets (hereinafter referred to as "birds"), whereby the approximate egg-laying performance of each bird can be recorded by the birds themselves.

A record of the birds' egg production is usually obtained by the use of nesting boxes of the so-called trap-front type. These nesting boxes vary considerably in design, but all comprise essentially a trap door or shutter at the entrance to the box, this door closing automatically when a bird has passed through the entrance. The bird is thus confined to the box until the door is opened manually from outside, when its number (for example, stamped on a ring on one of its legs) is noted, the egg is removed and the trap-door is reset preparatory for the next bird to enter the box. Obviously, for a poultry farmer with a large number of birds, this involves a considerable amount of time and labour, since all the nesting boxes must be periodically visited to release the trapped birds. This must be done at least once every two hours.

In order to relieve the poultry farmer of this task and yet enable him to form a substantially accurate assessment of his birds' egg-laying capacity it has been proposed to provide an arrangement whereby the identity of any bird entering a nesting box is automatically recorded.

In one such proposal an identification device in the form of a numbered roller is rotatably mounted on an upwardly extending arm carried on the back of each bird so that when the bird enters or leaves the nesting box by passing between confining walls the numbered roller rolls over an inking pad and a recording strip in that sequence to record the number of the bird, strip-advancing means being provided to be operated by the passage of a bird. In a similar proposal the numbered roller is so mounted in the arm as to have a castor action.

Experience has shown that these prior arrangements are not satisfactory owing to the fact that insufficient guidance is afforded to the numbered roller so that it does not roll squarely over the inking pad and recording strip due to the natural rolling gait of the bird, with the result that such record as is obtained in blurred and generally illegible. Moreover, it is found that a bird cannot itself exert sufficient upward pressure to impress the number properly.

It is an object of this invention to provide an improved apparatus for assessing the egg-productivity of birds which shall be free from such disadvantage.

According to the present invention recording apparatus for assessing the egg-productivity of birds comprises a recording mechanism to be mounted on a nesting box for actuation by a symbol attached to a bird, which symbol is characteristic of a given bird, said recording mechanism including means for positively constraining the symbol attached to the bird to travel along a predetermined path with respect to the recording mechanism as the bird enters or leaves the box and for maintaining the symbol in operative contact with the recording mechanism during at least part of its travel along said predetermined path.

Preferably the device for attachment to a bird comprises a light framework, an upwardly projecting arm carrying a rotatable roller bearing the identification symbol, preferably a number, at its outer end and a pair of guide rollers rotatably mounted on said arm. Conveniently these rollers are mounted co-axially with the numbering roller.

The means for constraining the symbol attached to the bird to move along a predetermined path preferably comprises a pair of guideways spaced apart to define a slot which is adapted to receive therein the upwardly projecting arm of a light framework attached to the bird and bearing the said symbol and to constrain the lateral movement thereof. Preferably the device attached to the bird includes a pair of guide rollers which roll over the upper surfaces of the guideways as the arm enters the slot and thereby control the vertical movement of the identification symbol. The guideways may conveniently be inclined upwardly towards an ink pad mounted above the slot and a recording strip of paper or card so mounted relative to the slot that the identification symbol contacts, in succession, the inking pad and the recording strip each time the bird enters or leaves the box. Means are also provided for advancing the recording strip for each record noted thereon.

Advantageously the means for advancing the recording strip comprises a pair of notched wheels operatively connected to a take-up roller for the recording strip and engageable and rotatable by the guide rollers of the device attached to the bird so as to advance the recording strip each time the guide rollers engage the notched wheels.

In order that the invention may be readily understood, reference will now be made to the accompanying drawings, in which.

Figure 1:
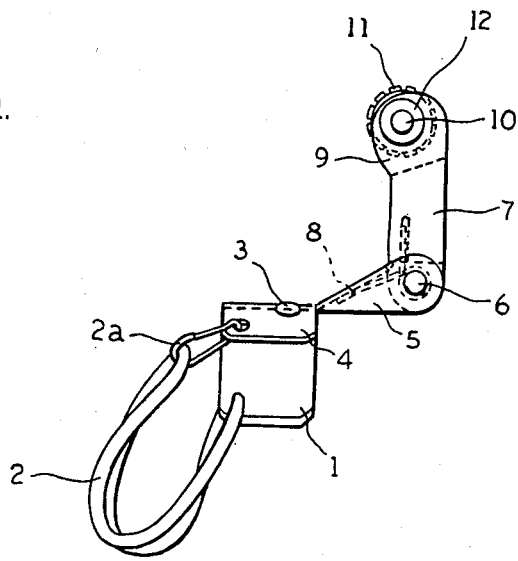
Fig. 1 is a side elevation of a numbering device and shows the harness by which the device may be attached to a bird.
Figure 2:
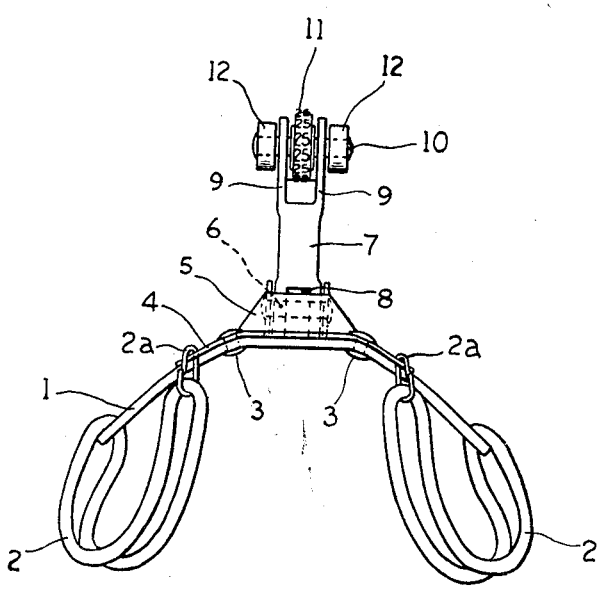
Fig. 2 is a front elevation of Fig. 1.
Figure 3:
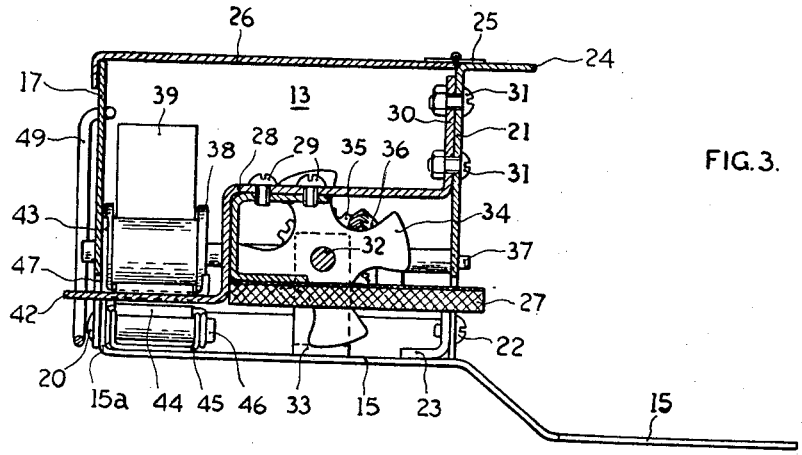
Fig. 3 is a cross-section, taken on the line III—III of Fig. 4, through a recording mechanism for attachment to a nest box and used in conjunction with the numbering device shown in Figs. 1 and 2.
Figure 4:
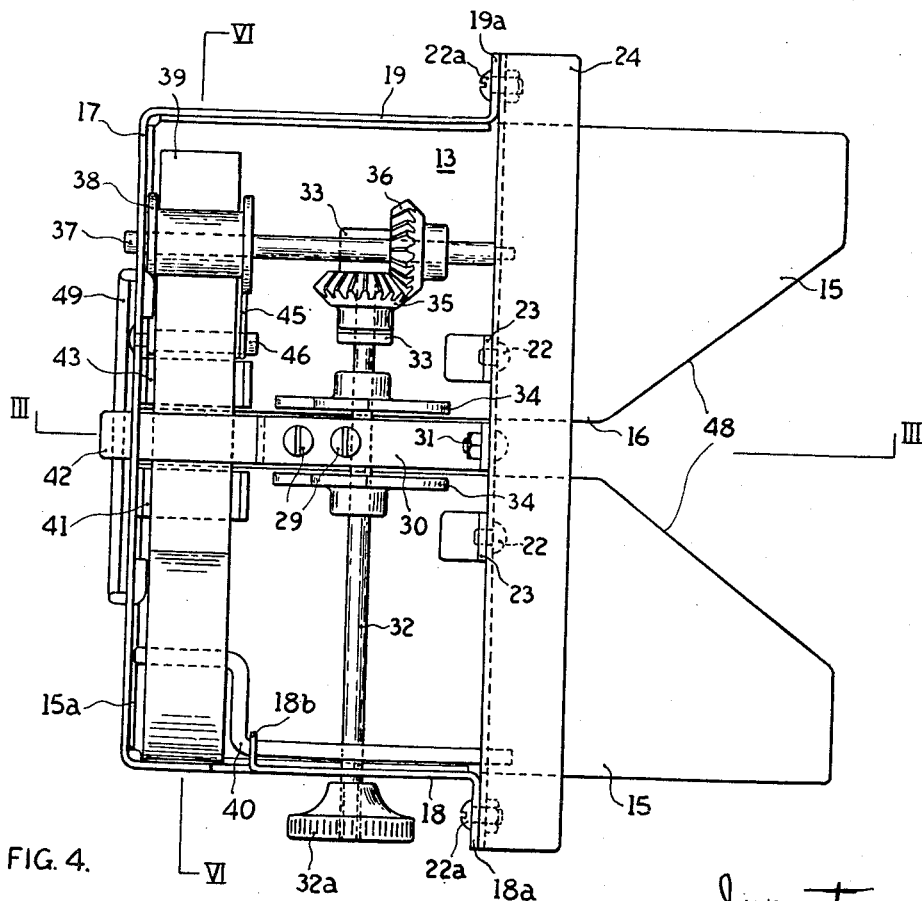
Fig. 4 is a plan of Fig. 3 with the top plate of the casing removed to show the internal mechanism.
Figure 5:
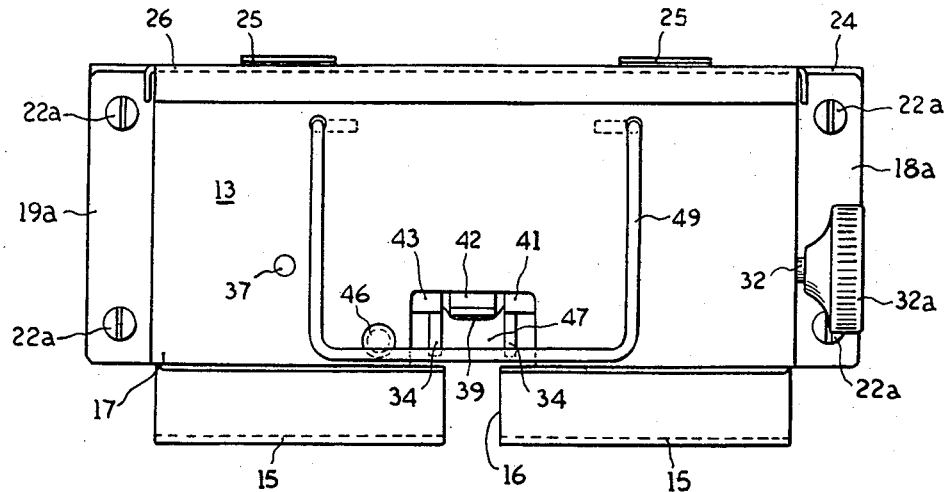
Fig. 5 is a rear elevation of the mechanism shown in Figs. 3 and 4 showing means for preventing actuation of the mechanism by a bird entering a nest box to which the mechanism is attached.
Figure 6:
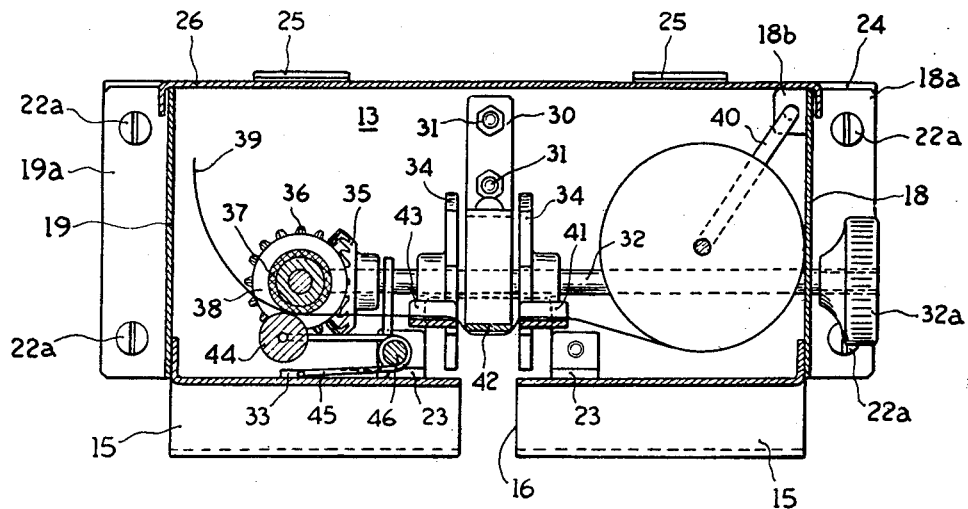
Fig. 6 is a section taken on the line VI—VI of Fig. 4 showing the means for supporting and advancing a strip of recording paper.

As illustrated in Figs. 1 and 2, the attachment for the bird consists of a strip 1 of cloth, leather or other suitable material constituting a saddle which is fitted over the bird's back just behind the shoulder, being held in position by two loops 2 of soft cord or tapes passed around the upper part of each wing and removably attached to the saddle by means of spring clips 2a. Secured to the saddle, such as by rivets 3, is a forked bracket 4, in the fork 5 of which is pivotally supported by means of a pivot 6, the lower end of a short arm 7 of light metal, wood or other rigid light-weight material. A light torsion spring 8 in the lower end of the arm 7 tends to hold it in a vertical position, although it may pivot backwards and forwards against the action of this spring. The upper end of the arm 7 is forked at 9 and supports a spindle 10 on which is mounted a plastic, rubber or rubber-tyred roller 11, around the periphery of which is repeated the identification symbol or number of the bird to which the saddle is to be fitted. The roller spindle 10 projects beyond the limbs of the fork 9 to receive at each end a small roller 12, the purpose of which will be hereinafter described.

Figure 9:
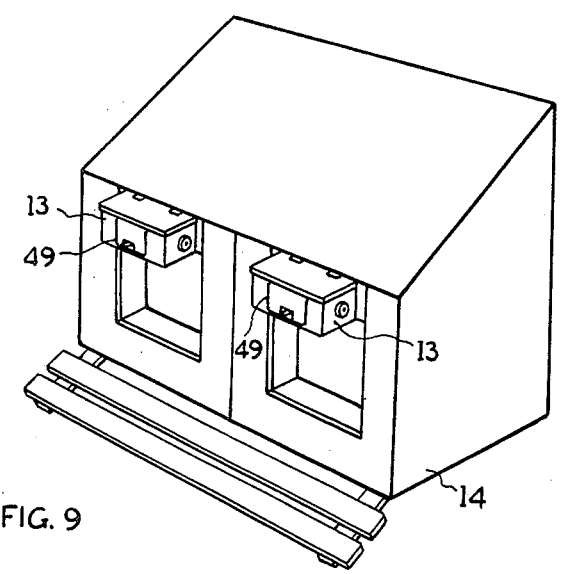
Fig. 9 is a perspective view of a pair of nesting boxes showing the position in which a recording mechanism constructed in accordance with the present invention is disposed in the entrance to each box.

The recording mechanism is mounted in a casing 13 fixed above the entrance to the nesting box 14 (as shown in Fig. 9) so that the bird must pass beneath it when entering and leaving the box. Referring now to Figs. 3–6, the casing 13 of the recording mechanism is formed of sheet metal and includes a bottom wall consisting of two plates 15 which are spaced apart to provide a central slot 16 of a width slightly greater than the roller-supporting arm 7 carried by the bird. The rear wall 17 and side walls 18, 19 are formed by a single U-shaped member and are secured at their lower edges to the bottom plates 15 by bolts or rivets 20 passing through the rear wall 17 and upstanding flanges 15a on the bottom plate 15. The front wall of the casing comprises a plate 21 which is secured at its lower edge by bolts 22 to lugs 23 attached to the bottom plates 15 and extends beyond the side walls 18, 19 to receive bolts 22a passing through flanges 18a, 19a of the side walls, the upper edge of the front wall being bent forwardly at 24 for the attachment of a hinge 25 carrying the top wall 26 of the casing.

An inking pad 27 is attached to a U-shaped bracket 28 which is secured, such as by bolts or rivets 29, to a bent supporting plate 30 having one end bolted at 31 to the front plate 21 in such a manner that the inking pad 27 is disposed above the slot 16. A spindle 32 having one end journalled in the side wall 18 and the other end journalled in a bracket 33 secured to one of the bottom plates 15 carries intermediate its ends a pair of notched wheels 34 which are located on opposite sides of, and project partially below, the inking pad 27 but not through the slot 16 in the bottom wall of the casing. One end of the spindle 32 carries a bevel gear 35 meshing with a similar gear 36 fixed to a horizontal spindle 37 extending at right-angles to the spindle 32 and journalled in the front and rear walls of the casing.

The spindle 37 also carries at its end adjacent to the rear wall 17, a take-up roller 38 for the recording strip 39 which is of paper or card in roll form and is rotatable mounted on one end of a bent rod 40 having its other end journalled in the front wall 21 and supported intermediate its ends in a lug 18b stamped from the side wall 18. The recording paper 39 is passed over a fixed guide strip 41, below a resilient guide strip 42 and over a second guide strip 43 when it is initially drawn from the roll and fixed to the take-up roll 38, a small roller 44 carried by one end of a hair-pin spring 45 mounted on a pin 46 projecting from the front wall 21 being provided to press the paper against the roller 38. The fixed guides 41 and 43 are U-shaped in cross-section and are attached to the rear wall 17. The resilient guide 42 comprises the free end of the bent supporting plate 30 and projects through an aperture 47 in the rear wall 17 so that it may be flexed upwardly to facilitate the paper-threading operation. The recording paper 39 may be advanced manually by rotation of a knob 32a connected to the outer end of the spindle 32.

The recording of the bird's number on the paper 39 may be effected either when it is entering or when it is leaving the nesting box 14. The latter is preferred, however, and in this case, the casing is arranged in the entrance of the box in the manner shown in Fig. 9 and the recording proceeds as follows:

As the bird leaves the nest, the projecting arm 7 enters the slot 16 in the bottom of the casing of the recording mechanism. For this purpose, the bottom plates 15 of the casing are stepped downwardly and extended in a lower plane forwardly of the front wall 21, the entrance to the slot 16 being in the shape of a wide V 48. As the arm 7 carrying the numbering roller 11 travels in the slot 16 and through an opening in the front wall 21 it controls the lateral movement of the roller 11 and the two side rollers 12 above referred to run along the upper surface of the bottom plates 15 of the casing on either side of the said slot guiding the roller 11 and controlling the vertical movement thereof. The numbering roller 11 rolls over the inking pad 27 and the side rollers 12 actuate the notched wheels 34 of the recording mechanism to rotate them a part of a revolution and operate the bevel gearing 35, 36 above referred to to advance the recording paper 39. Immediately afterwards, the numbering roller 11 rolls transversely across the recording strip 39 to impress the number on the latter end out through the aperture 47 in the rear wall 17. A U-shaped loop of wire 49 is preferably hinged to the rear wall 17 of the casing to hang with its base across the exit end of the slot 16 to prevent the numbering roller 11 from entering the slot 16 from the exit end whilst swinging freely away from the casing to permit the numbering roller to leave the slot through the exit end. Preferably, the entrance to the nesting box is kept as small as possible to ensure that the birds enter and leave the box centrally. Although these arrangements do not give a positive record of the eggs laid by each individual bird, since some birds may occasionally enter a nesting box without laying an egg, it is, nevertheless, possible, by noting the number of days on which each bird enters the nesting box, to form a substantially accurate assessment of its laying ability.

Figure 7:
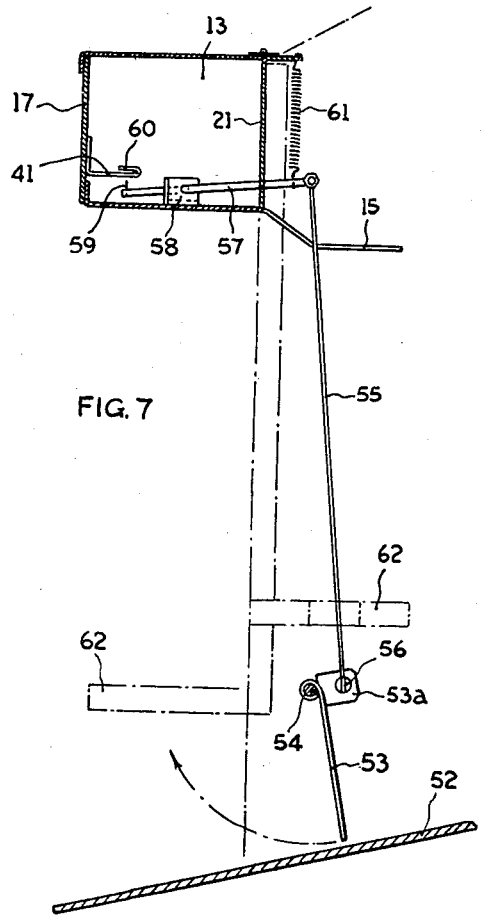
Fig. 7 is a cross-section, taken on the line X—X of Fig. 8, through the casing of the recording mechanism and showing means for producing a record of the eggs laid by individual birds, the recording mechanism shown in Figs. 3 and 4 being omitted for the sake of clarity.
Figure 8:
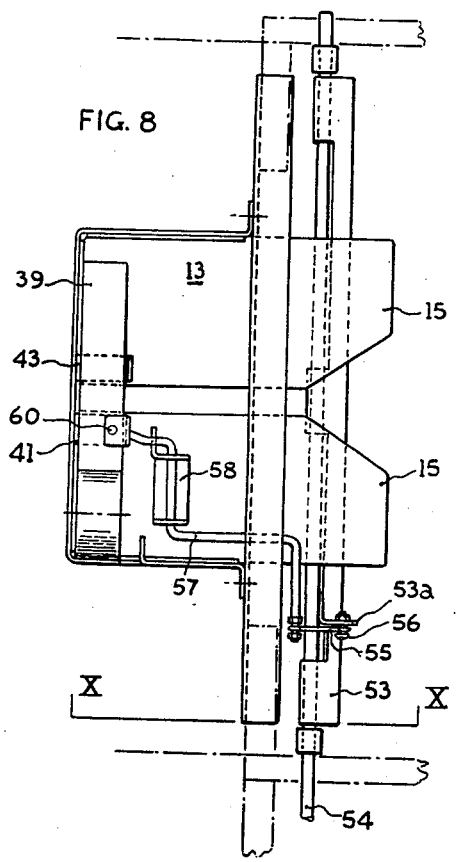
Fig. 8 is a plan of Fig. 7 with the top plate of the casing removed.

As illustrated in Figs. 7 and 8, the floor 52 of the nest box slopes downwardly to the entrance thereof so that the eggs are caused to roll out of the nest. A flap 53, which extends the full width of the nest and is free to swing on a pivot 54 carried by the side walls of the box, is disposed in the path of movement of the eggs as they roll out of the nest. A lug 53a is struck from the upper edge of the flap 53 adjacent to one edge thereof and has one end of a flexible link 55, such as a cord, wire or chain, fastened thereto by means of a rivet or bolt 56. The other end of the flexible link 55 is secured between a pair of nuts on the outer end of a rigid wire 57 which is screw-threaded for this purpose. This rigid wire is of cranked form and extends through an opening in the front wall 21 into the interior of the casing in which it is pivotally mounted in a U-shaped bracket 58 fixed to one of the bottom plates 15 of the casing. A recording needle 59 is secured in the inner end of the rigid wire 57 and is located beneath the recording paper 39 on the fixed guide strip 41 which is provided with an aperture 60 to permit the passage of the needle 59.

When an egg rolls down the sloping floor 52 of the nest box and swings the flap 53 about its pivot 54 in the direction of the arrow shown in Fig. 7, a downward pull is exerted on the flexible link 55 which causes the needle 59 to enter the aperture 60 in the fixed guide strip 41 and to puncture the recording paper 39, a tension spring 61 being connected between the rigid wire member 57 and the portion 24 of the front wall 21 to return the parts to the position shown in Fig. 7. When the bird leaves the nest box 14, the recording paper 39 is advanced and the numbering device on the bird records the bird's number alongside the hole punctured in the paper by the needle 59. This arrangement provides an almost completely accurate record of the eggs laid by each individual bird since any recorded number which is not accompanied by a punctured hole may be discounted, accidental damage to, or actuation of, the flap by the bird being obviated by covering it with alighting boards 62.

It is obvious that the constructions above described are only by way of example and that many modifications of the recording mechanism in the nesting box and of the attachment for the bird are possible within the scope of the invention. For example, the bevel gear drive may be replaced by a simple direct drive. Moreover, the recording paper may be replaced by a card inserted through a slot in the side of the casing to be moved automatically in the same manner as the paper. Furthermore, the notched wheels could be replaced by simple bosses formed with radial spokes.

What I claim is:

1. In a recording apparatus for assessing the egg-productivity of a bird comprising in combination a nesting box, a passage in said box to be traversed by said bird, a device adapted to be attached to said bird, a rotatable roller mounted on said device and bearing a symbol characteristic of said bird, and a recording mechanism mounted on said box, said mechanism including an inking pad and a record strip arranged to be contacted by said symbol in succession as said bird traverses said passage, the provision of lateral guide means associated with said mechanism and arranged to co-operate with said device as said bird traverses said passage positively to constrain said device to move along said passage without substantially any lateral play, and vertical guide means associated with said device and arranged to co-operate with said lateral guide means positively to control the vertical displacement of said roller to prevent any vertical play of said roller at least whilst said symbol contacts said inking pad and said record strip.

2. Recording apparatus according to claim 1 wherein means is provided for advancing said record strip each time said strip is contacted by said symbol.

3. Recording apparatus according to claim 1 wherein said lateral guide means comprises a pair of guide elements arranged parallel to and spaced from each other to define a slot along which said device is constrained to move without lateral play as said bird traverses said passage.

4. Recording apparatus according to claim 1 wherein said lateral guide means comprises a pair of guide elements arranged parallel to and spaced from each other to define a slot along which said device is constrained to move without lateral play as said bird traverses said passage and said vertical guide means comprises a pair of guide rollers mounted on said device and arranged to run over the upper surfaces of said guide elements adjacent said slot to constrain the symbol on said rotatable roller to contact said inking pad and said record strip in succession without vertical play.

5. In a recording apparatus for assessing the egg-productivity of a bird comprising in combination a nesting box, a passage in said box to be traversed by said bird, a device adapted to be attached to said bird, a rotatable roller mounted on said device and bearing a symbol characteristic of said bird, and a recording mechanism mounted on said box, said mechanism including an inking pad and a record strip arranged to be contacted by said symbol in succession as said bird traverses said passage, the provision of a pair of guide elements disposed in said passage parallel to and spaced from each other to define a slot along which said device is constrained to move without lateral play as said bird traverses said passage, and a pair of guide rollers mounted on said device and arranged one on each side of said rotatable roller and co-axial therewith, said guide rollers being adapted to co-act with the upper surfaces of said guide elements at the marginal edges of said slot as the device moves therealong to constrain said rotatable roller to contact said inking pad and said record strip in succession without any vertical play.

6. Recording apparatus according to claim 5 including means for advancing said record strip each time a bird traverses said passage.

7. In a recording apparatus for assessing the egg-productivity of a bird comprising in combination a nesting box, a passage in said box to be traversed by said bird, a device adapted to be attached to said bird, a rotatable roller mounted on said device and bearing a symbol characteristic of said bird and a recording mechanism mounted on said box, said mechanism including an inking pad and a record strip arranged to be contacted by said symbol in succession as said bird traverses said passage, the provision of a pair of guide elements disposed in said passage parallel to and spaced from each other to define a slot along which said device is constrained to move without lateral play as said bird traverses said passage, a pair of guide rollers mounted on said device and arranged one on each side of said rotatable roller and co-axial therewith, and means for advancing said record strip each time a bird traverses said passage, said guide rollers being adapted to co-act with the upper surfaces of said guide elements at the marginal edges thereof defining said slot as said device moves therealong to operate said strip advancing means and to constrain said rotatable roller to contact said inking pad and said record strip in succession without vertical play.

8. Recording apparatus according to claim 7 including a pair of fixed guides arranged to define an auxiliary slot located over and spaced from a part of the length of said slot defined by said guide elements and a resilient guide arranged to overlie said auxiliary slot, said record strip extending transversely across said auxiliary slot and being supported by said fixed guides and said resilient guide preventing said strip from moving vertically to any substantial extent when contacted by said rotatable roller.

9. Recording apparatus according to claim 7 wherein means is provided for preventing said rotatable roller contacting said record strip when a bird traverses said passage in a predetermined direction.

10. In a recording apparatus for assessing the egg-productivity of a bird comprising in combination a nesting box, an entrance and an exit aperture in said box, a passage connecting said apertures to be traversed by said bird, a device for attachment to said bird, a rotatable roller mounted on said device and bearing a symbol characteristic of said bird, and a recording mechanism including an inking pad and a record strip mounted on said box over said exit aperture, the provision of means for positively constraining said rotatable roller to traverse a predetermined path relative to said mechanism to bring said roller in contact with said inking pad and record strip in succession without any lateral or vertical play as said bird traverses said passage in one direction, and a U-shaped member hinged to said box with its base extending across said exit aperture to prevent said roller contacting said record strip as said bird traverses said passage in the other direction.

References Cited in the file of this patent

UNITED STATES PATENTS

| Number | Name | Date |
| --- | --- | --- |
| 1,842,839 | Rainwater | Jan. 26, 1932 |
| 1,858,367 | Leonard | May 17, 1932 |
| 2,068,642 | D'Almeida | Jan. 26, 1937 |
| 2,204,284 | Sifakas | June 11, 1940 |